United States Patent [19]

Liegner

[11] Patent Number: 5,050,539
[45] Date of Patent: Sep. 24, 1991

[54] ACARICIDE DISPENSER

[76] Inventor: Kenneth B. Liegner, 8 Barnard Rd., Armonk, N.Y. 10504

[21] Appl. No.: 559,161

[22] Filed: Jul. 30, 1990

[51] Int. Cl.$^5$ ............................................. A01K 29/00
[52] U.S. Cl. .................................................... 119/159
[58] Field of Search ......................................... 119/159

[56] References Cited

U.S. PATENT DOCUMENTS

| 3,602,199 | 8/1971 | Diggs | 119/159 |
| 3,870,023 | 3/1975 | Wilson | 119/159 |
| 4,050,414 | 9/1977 | Knochel et al. | 119/1 |
| 4,150,109 | 4/1979 | Dick et al. | 119/159 |
| 4,185,581 | 1/1980 | Tilton | 119/159 |
| 4,362,126 | 12/1982 | Ellerstorfer et al. | 119/159 |
| 4,379,440 | 4/1983 | Thedford et al. | 119/159 |
| 4,459,942 | 7/1984 | Cauthron | 119/159 |
| 4,567,856 | 2/1986 | Sorenson | 119/159 |
| 4,580,529 | 4/1986 | Wilson | 119/159 |

Primary Examiner—Paul J. Hirsch
Attorney, Agent, or Firm—Kane, Dalsimer, Sullivan, Kurucz, Levy, Eisele and Richard

[57] ABSTRACT

An apparatus is disclosed for the delivery of acaricides to free ranging deer, other ungulates, and other animals in order to control deer ticks and other tick vectors of Lyme disease including a salt-lick station haivng a platform upon which the animals tread, activating a mechanism to pump an appropriate acaricide to spray members through which the acaricide is sprayed to envelop the salt-seeking animal in a mist of acaricide in order to kill ectoparasites.

11 Claims, 3 Drawing Sheets

ACARICIDE DISPENSER

FIELD OF THE INVENTION

The present invention relates to controlling disease bearing ticks and parasites on animals and in turn on humans.

BACKGROUND OF THE INVENTION

There exist many diseases that are transmissible to man and animals by ticks and parasites. Of particular concern is Lyme disease. This desease has been shown to have serious and long lasting debilitating effects on man and domestic animals, including dogs, cats, and horses.

The economic impact of Lyme disease is considerable in terms of cost of health care associated with the disease, and loss of productivity for people disabled by the illness. Populations of deer ticks (Ixodes dammini), the tick vector of the disease, have shown asymptotic growth in areas endemic for Lyme disease in the past several years. As yet an effective means of controlling the deer tick has been elusive. While the eradication of deer, the preferred host, has been successful in reducing deer tick population on isolated island settings, this approach is controversial and the wholesale slaughter of deer is objectionable to many people on moral and aesthetic as well as on practical grounds. Dammnix ®, a permethrin-soaked cotton ball preparation, has shown some success in reducing deer tick populations by ridding deer ticks from the white-footed mouse (Peromyscus leucopus), a reservoir host of Lyme disease, in limited areas.

The white-tailed deer (Odocoileus virginianus) is the preferred host of the adult female deer tick. When these ticks attach to deer, feed to repletion and then drop off, they produce between 2500-3500 eggs, most or all of which hatch in the leaf litter below. Upwards of 250-500 deer ticks have been counted on a single deer carcass bagged during hunting season in a Lyme endemic area of the Northeastern United States. Thus, a single deer at a single point in time is responsible for the generation of 1,500,000 deer ticks. Deer are therefore potent amplification arms for deer tick populations and hence of Lyme disease.

Rather than slaughtering deer, which might result in deer ticks seeking other alternate hosts, including man, it would appear advantageous to exploit the deer-seeking behavior of deer ticks in order to effectuate their own destruction. If this could be achieved, one would then have a continuous means of renewably reducing deer tick populations, which would translate to reduced risk of transmission of Lyme disease to humans and domestic animals. Deer, in essence, are attractants and concentrators of deer ticks from the natural environment. Deer and deer ticks have evolved together in nature over eons to satisfy this required host parasite relationship.

Deer are shy and secretive animals, yet their behavior is predictable. Herds of deer hide in densely wooded areas and emerge to feed on grasses in meadows and other clearings and along to the edge of wooded habitats. The animals migrate along established deer trails. Like other herbivores they crave and require regular sources of sodium chloride and will seek and return to salt-licks on a periodic basis.

SUMMARY OF THE INVENTION

It is therefore the object of the invention to provide for a means of controlling the deer tick population through the effective application of acaricides thereto.

In this regard, the present invention takes advantages of the predictable nature and needs of deer to deliver acaricides to deer. A salt-lick is provided to entice the deer to a particular location at which an automatic spray device is located. In this way deer come to the site of application of the acaricide on a regular basis to be deticked. Over a period of time this should result in meaningful reductions in deer tick populations.

By point of application of acaricides to deer, harmful impact of insecticides on the environment is also minimized. Also, spraying acaricides on the coats of the animals should avoid contaminating the venison which ultimately may be used for human consumption.

The invention is a practical and cost-effective means of controlling deer tick populations and hence Lyme disease. Adequate numbers of the device may have to be deployed strategically in deer habitat in order to produce desired reductions in deer-tick population in a particular region.

BRIEF DESCRIPTION OF THE DRAWINGS

Thus by the present invention its objects and advantages will be realized, the description of which should be taken in conjunction with the drawings, wherein.

DETAILED DESCRIPTION OF THE PREFERRED EMBODIMENT

Figure 1:
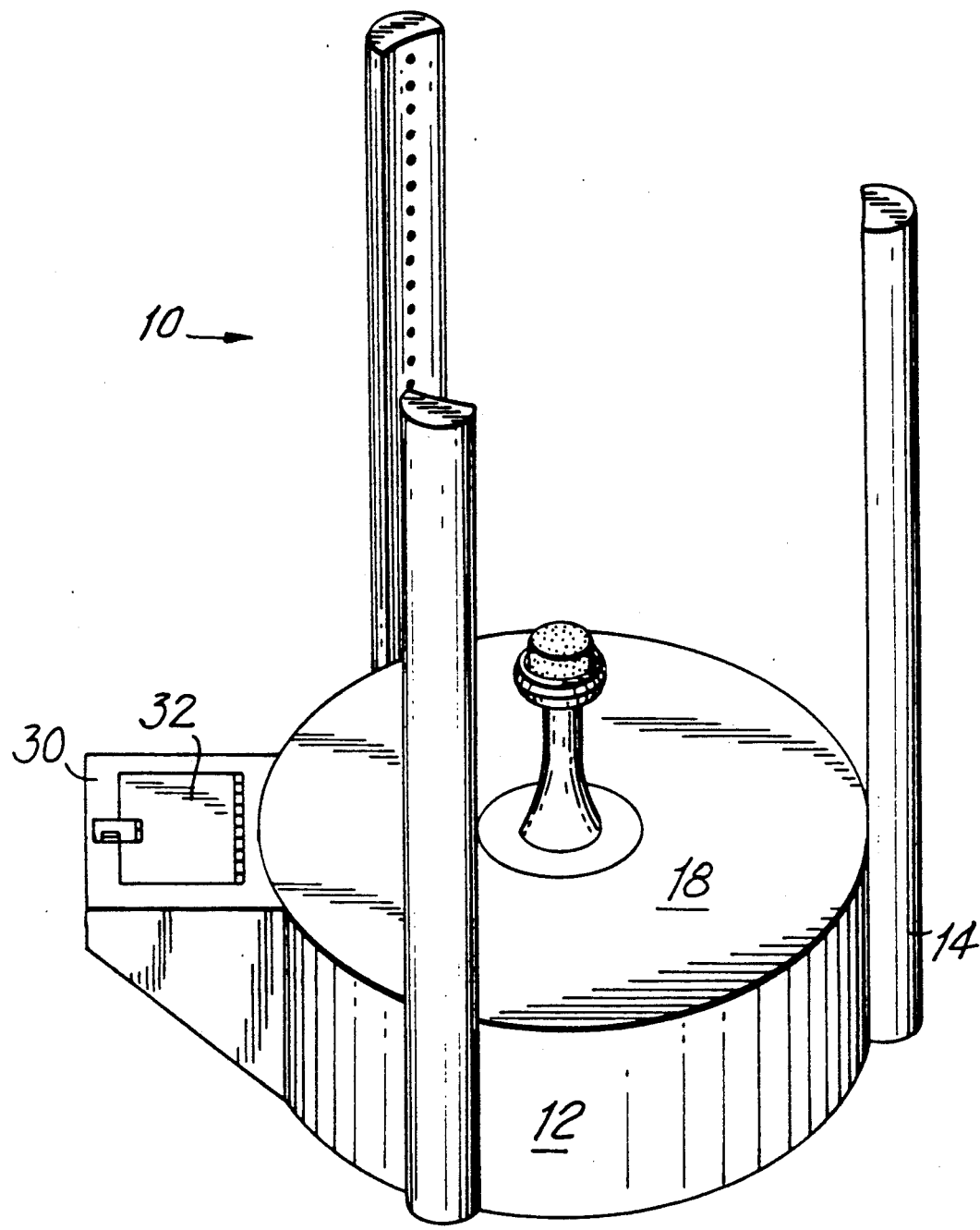
FIG. 1 is a side, elevational view of the acaricide delivering device incorporating the teachings of the present invention.
Figure 2:
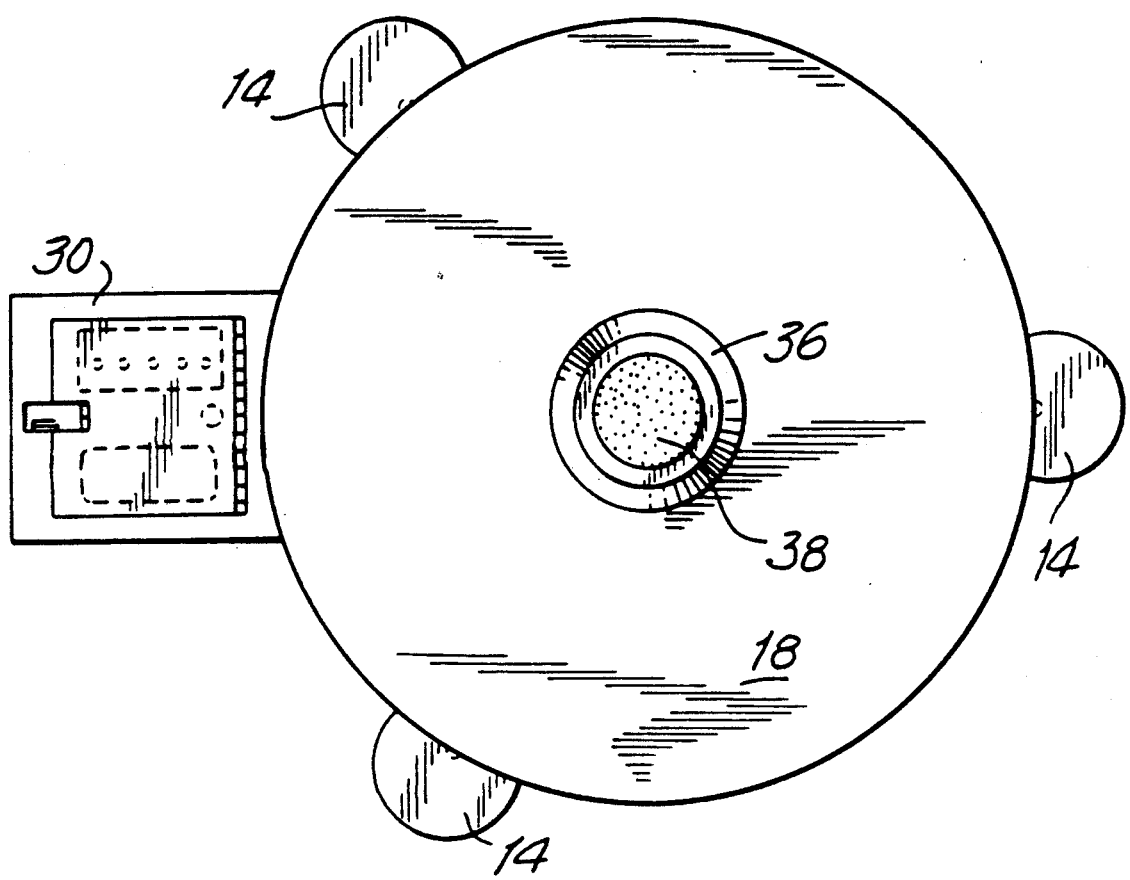
FIG. 2 is a top plane view of the acaricide delivering device.
Figure 3:
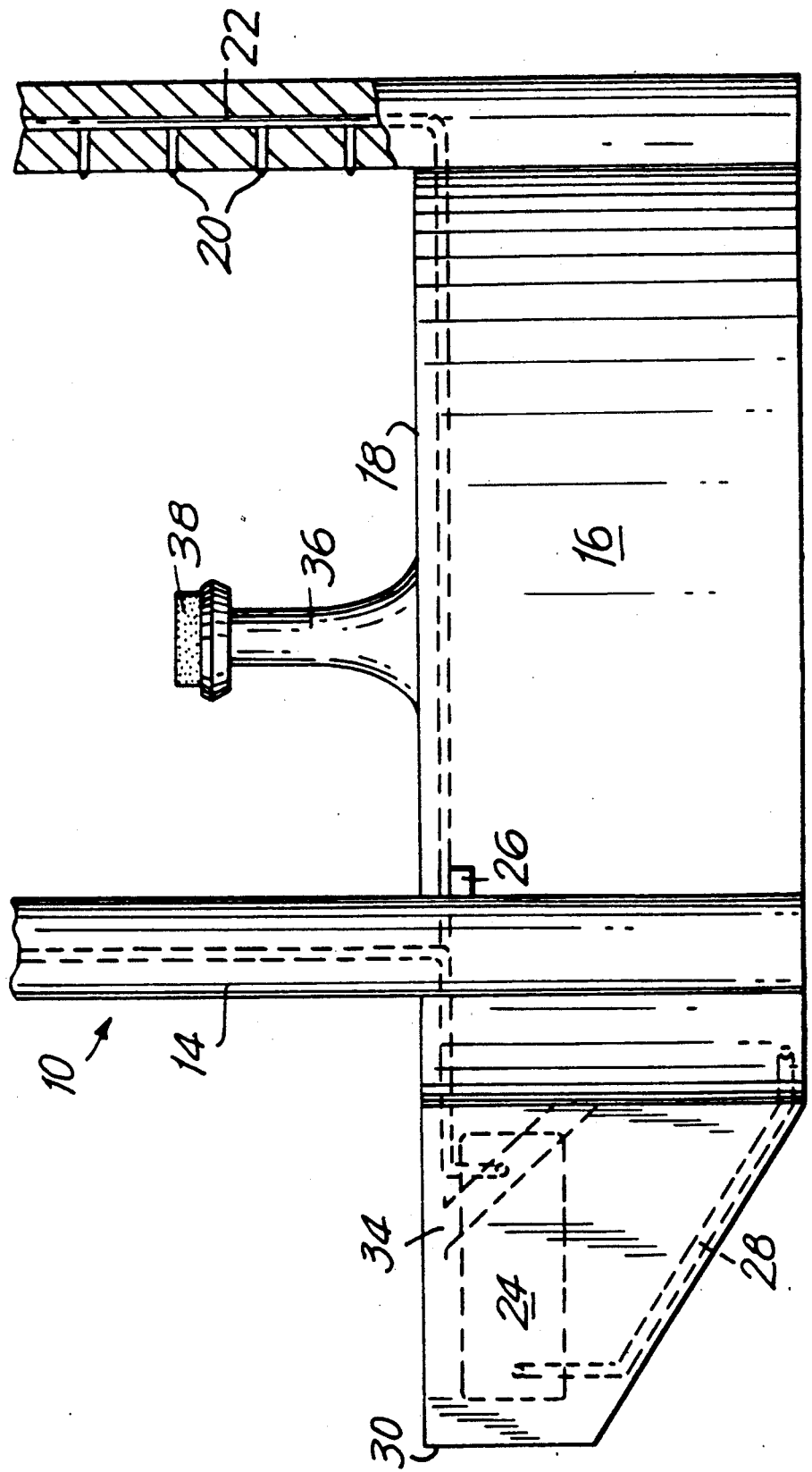
FIG. 3 is a side, partially section view of the acaracide delivery device.

Turning now more particularly to the drawings, there is shown a delivery system 10 which comprises a base 12 and three upstanding spray members 14. The base 12 may by cylindrical in nature and vary from 6-12 feet in diameter and include internally a reservoir 16 for the material to be sprayed. This material for the deer tick would be an acaricide.

The base 12 includes a platform 18 thereon. The spray members are shown at an equally spaced distance about the base 12 and supported thereby. However as will be apparent, such construction may vary so long as it is suitable for purpose.

Members 14 include a plurality of spray nozzles 20 which are coupled to a feed tube 22. Tube 22 receives the acaricide by way of a pump mechanism 24 which again may be of a varying design as long as it functions in the desired manner.

Upon sensing an animal on the platform 18, a sensing device 26 which for example may sense the weight of the animal on the platform, activates the pump 24. The pump mechanism 24 would propel a suitable acaricide from the reservoir 16 via an inlet 26 out to the nozzles 20 via feed tube 22 emerging therefrom as a fine mist. This would envelop the body of the ungulate in the acaricide in addition to possibly an area surrounding the base so that any accompanying herd of animals might also be deticked at the same time.

The pump mechanism 24 might be actuated by a wide variety of devices such as a solenoid or other pressure sensitive device, perhaps energized by a replaceable electric battery. Also, solar panels could serve as a renewable source of power. Alternatively, the platform could rest upon a hydraulic cylinder to compress the reservoir of acaricidal fluid thereby utilizing the weight of the animal to provide the energy to propel the acaricide to the spray nozzles 20 in the upright members 14. If an electric motor is utilized to drive the pump, one designed to generate a minimum amount of noise so as not to alarm the salt-seeking animals should be chosen.

The pump mechanism 24 may be located in a pump housing 30 which may include a lockable latch 32. To allow for the periodic refilling of the reservoir 16, a lockable filling port 34 may be provided.

To lure the animal onto the platform 18, an upright receptacle 36 would maintain the salt block 38 at a desired height, such as that suitable for juvenile and adult deer. If it is desired that another animal be lured onto the platform, then of course adjustments can be made to the position, type of the bait and the sensitivity of the sensing mechanism.

Several types of acaricide in a liquid formulation might be suitable for use for deer tick control such as permethrin, carbaryl, diazinon, chlorpyrifos, or recently developed synthetic pyrethroid substances. An important factor in choice of acaricide might be to select the agent least noxious to the ungulates' sense of smell.

It would be desirable for the device to be as inconspicuous as possible so as not to alarm the approaching deer. For this reason, the reservoir and platform would best be installed into a depression dug into the ground along or close to established deeer trails.

The upright members might also be designed to simulate tree trunks so as to blend into the natural setting to encourage deer to approach the salt lick while making the device aesthetically pleasing to humans.

Moreover, the spraying members may of course take on different configurations so as long as they serve to deliver the acaricide to the ungulate. Angled jets appropriately positioned with respect to the bait may be used or any other means suitable for the purpose. Alternatively a sensor comprising for example a photo electric cell may be positioned with respect to the bait and separately placed acaracide dispersing members. Its operation and purpose would be the same as that previously discussed, to lure the intended animal, sense its presence and then spray it with an acaracide. The pump activated reservoir can be positioned where desired. This would provide a more portable and flexible arrangement to that utilizing a platform.

Thus by the present invention its objects and advantages are realized and although a preferred embodiment has been disclosed and described in detail herein, its scope should not be limited thereby, rather its scope should be determined by that of the appended claims.

What is claimed is:

1. An apparatus for delivering a spray of substance to an animal comprising:
   bait means on a platform means providing a lure for the desired animal into a predetermined location in a natural setting wherein access to the bait means is substantially unobstructed so as to attract animals of the wild;
   sensing means comprising means of sensing the animal on the platform means;
   source of substance to be sprayed;
   delivery means for delivering a said spray the predetermined location with respect to the bait; and
   said delivery means being activated by said sensing means when said sensing means senses the presence of the desired animal so as to spray said substance on the desired animal in addition to other animals within the envelope of the spray.

2. The apparatus in accordance with (claim 1) wherein said bait means includes salt which is used as a lure for deer, said spray of substance is a liquid acaricide.

3. The apparatus in accordance with claim 1, wherein said delivery means includes a pump mechanism for pumping acaricide from a reservoir.

4. The apparatus in accordance with claim 3 wherein said platform means is located on a base and said reservoir is located in said base.

5. The apparatus in accordance with claim 4 which includes a plurality of spray means coupled to the pump mechanism and positioned with respect to the bait so as to envelop the animal with acaricide upon activation of the pump mechanism.

6. The apparatus in accordance with claim 2 wherein said acaricide is taken from the group comprising permethrin, carbaryl, diazinon, chlorpyrifos and synthetic pyrethroids.

7. The apparatus in accordance with claim 5 wherein said acaricide is taken from the group comprising permethrin, carbaryl, diazinon, chlorpyrifos and synthetic pyrethroid.

8. A method of spraying an animal with a substance comprises the steps of:
   providing a bait on a platform means to lure the animal to a predetermined location which is substantially unobstructed so as to attract animals of the wild;
   providing said platform means in said predetermined location;
   providing means for sensing the presence of the animal on the platform means; and
   activating a spraying device when the animal is sensed on the platform means to spray the animal with the substance in addition to other animals within the envelope of the spray.

9. The method in accordance with claim 8 wherein the animal sprayed is deer for the purpose of controlling deer ticks and the substance sprayed is an acaricide.

10. The method in accordance with claim 9 wherein said means of determining the presence of the animal is by sensing its weight.

11. The method in accordance with claim 9 wherein said substance sprayed is a liquid acaricide which is taken from the group comprising permethrin, carbaryl, diazinon, chlorpyrifos and synthetic pyrethroids.

* * * * *